United States Patent
Tarumi et al.

(10) Patent No.: US 6,821,580 B2
(45) Date of Patent: Nov. 23, 2004

(54) LIQUID-CRYSTALLINE MEDIUM AND LIQUID-CRYSTAL DISPLAY

(75) Inventors: Kazuaki Tarumi, Seeheim (DE); Brigitte Schuler, Grossotheim (DE); Sabine Schoen, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/920,619

(22) Filed: Aug. 3, 2001

(65) Prior Publication Data

US 2002/0047105 A1 Apr. 25, 2002

(30) Foreign Application Priority Data

Aug. 11, 2000 (DE) .......................................... 100 39 379

(51) Int. Cl.[7] .......................... C09K 19/30; C09K 19/12
(52) U.S. Cl. ............... 428/1.1; 252/299.63; 252/299.66
(58) Field of Search ...................... 428/1.1; 252/299.63, 252/299.66, 299.61

(56) References Cited

U.S. PATENT DOCUMENTS

| | | | |
|---|---|---|---|
| 5,993,692 A | * 11/1999 | Tarumi et al. | 252/299.63 |
| 6,045,878 A | * 4/2000 | Tarumi et al. | 349/182 |
| 6,159,393 A | * 12/2000 | Tarumi et al. | 252/299.63 |
| 6,399,163 B1 | * 6/2002 | Tomi et al. | 428/1.1 |
| 6,635,190 B2 | * 10/2003 | Heckmeier et al. | 252/299.63 |

FOREIGN PATENT DOCUMENTS

| | | | |
|---|---|---|---|
| DE | 19693257 | * | 7/1997 |
| WO | WO 96/05159 | * | 2/1996 |

* cited by examiner

*Primary Examiner*—Shean C Wu
(74) *Attorney, Agent, or Firm*—Miller, White, Zelano, Branigan, P.C.

(57) ABSTRACT

The invention relates to a liquid-crystalline medium of positive dielectric anisotropy, characterized in that it comprises in each case one or more compounds of the general formulae I, II and IV

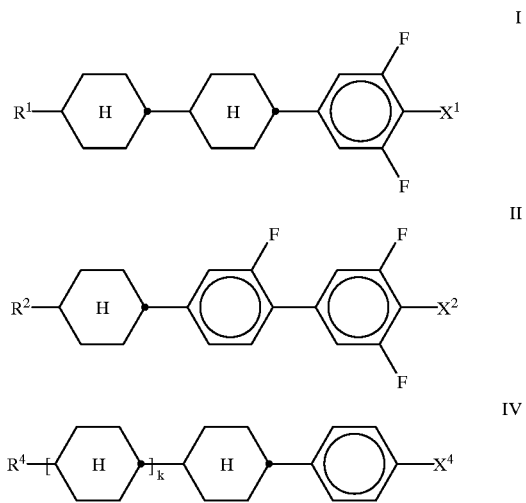

in which the parameters are as defined in the text, and to the use thereof as a constituent of a multibottle system and in electro-optical displays, and to multibottle systems of this type and displays which contain this medium.

18 Claims, No Drawings

LIQUID-CRYSTALLINE MEDIUM AND LIQUID-CRYSTAL DISPLAY

The present invention relates to a liquid-crystalline medium, in particular one of low optical anisotropy, and to the use thereof for electro-optical purposes, and to electro-optical displays containing this medium.

Liquid-crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic (TN) structure.

The liquid-crystal materials must have good chemical and thermal stability and good stability to electric fields and electromagnetic radiation. Further-more, the liquid-crystal materials should have low viscosity and produce short addressing times, low threshold voltages and high contrast in the cells.

For a low dependence of the contrast on the viewing angle, the observance of a low optical retardation, as described in DE 30 22 818, preferably in the range from 0.4 to 0.5 μm, is advantageous in TN cells.

They must furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and, in particular on use in a display addressed by means of a matrix of active switching elements, low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapor pressure are desired.

Matrix liquid-crystal displays of this type are known. Non-linear elements which can be used for individual switching of the individual pixels are, for example, electrically non-linear elements as active elements (these can be, for example, transistors). The term "active matrix" is then used, where a distinction can be made between two types:
1. MOS (metal oxide semiconductor) or other diodes on a silicon wafer as substrate.
2. Thin-film transistors (TFTS) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is generally arranged in such a way that a filter element is opposite each switchable pixel.

The TFT displays usually operate as TN cells with crossed polarizers in transmission and are illuminated from the back.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not meet today's requirements.

Besides liquid-crystal displays which use back lighting, i.e. are operated transmissively and optionally transflectively, there is also particular interest in reflective liquid-crystal displays. These reflective liquid-crystal displays use the ambient light for information display. They thus consume significantly less energy than back-lit liquid-crystal displays of corresponding size and resolution. Since the TN effect is characterised by very good contrast, reflective displays of this type are readily legible even under bright ambient conditions. This is already known of simple reflective TN displays, as used, for example, in wristwatches and pocket calculators. However, the principle can also be applied to high-quality, higher-resolution active matrix-addressed displays, such as, for example, TFT displays. Here, as is already the case in the generally conventional transmissive TFT-TN displays, the use of liquid crystals of low birefringence (Δn) is necessary in order to achieve low optical retardation (d·Δn). This low optical retardation results in a low viewing-angle dependence of the contrast, which is usually acceptable (cf. DE 30 22 818). In reflective displays, the use of liquid crystals of low birefringence is much more important than in transmissive displays, since in reflective displays, the effective layer thickness through which the light passes is approximately twice as great as in transmissive displays of the same layer thickness.

There thus continues to be a great demand for MLC displays and in particular reflective MLC displays having very high specific resistance at the same time as a large working-temperature range, short response times even at low temperatures and low threshold voltage which do not have these disadvantages, or only do so to a reduced extent.

Easy matching of the properties of the liquid-crystal mixture to the requirements of specific liquid-crystal cells of the respective display types is desired. In order to achieve this requirement, so-called multibottle systems are employed. Multibottle systems of this type consist of individual liquid-crystal media which are to be mixed with one another. In the simplest case, they consist of two different media which differ only in the value of one physical property, but have essentially the same values in all others. Thus, for example, the variable property may be the birefringence of the liquid-crystal medium, which enables matching of the optical retardation of the display cell to its layer thickness, or the threshold voltage of the medium, which enables matching to the operating voltage available for addressing. 4-bottle systems consist of four liquid-crystal media which differ in each case in pairs in one of two properties and agree in all other properties.

DE 43 37 439 describes multibottle systems by means of which liquid-crystalline compositions for TN displays having birefringence values in the range from 0.115 to 0.165 and threshold voltages of from 1.2 to 2.1 V can be achieved. However, these liquid-crystal media have low clearing points (below 70° C.) and low voltage holding ratio values which are not adequate for most AMD applications. DE 196 03 257 describes multibottle systems which cover a similar parameter range. The birefringence extends from 0.120 to 0.160 and the threshold voltage from 1.2 to 2.2 V. The clearing points are significantly higher than those of the systems in DE 43 47 439, but the voltage holding ratio values are even lower.

In TN (Schadt-Helfrich) cells, media are desired which facilitate the following advantages in the cells:
 broadened nematic phase range (in particular down to low temperatures)
 the ability to switch rapidly at low temperatures,
 increased stability to UV radiation (longer life)
 lower threshold (addressing) voltage, and
 low birefringence, particularly for an improved viewing angle range.

The media available from the prior art do not enable these advantages to be achieved while simultaneously retaining the other parameters.

The invention has an object of providing media, in particular for MLC displays of this type, which do not have the above-mentioned disadvantages, or only do so to a lesser extent, and preferably at the same time have very high specific resistances and low threshold voltages as well as low birefringence values.

It has now been found that this and other objects can be achieved if media according to the invention are used in displays.

Upon further study of the specification and appended claims, further objects and advantages of this invention will become apparent to those skilled in the art.

The present invention furthermore has an object of providing multibottle systems and in particular 4-bottle systems which conform to the requirements of AMD applications.

This is achieved by the use of media according to the invention.

The invention thus relates to a liquid-crystalline medium based on a mixture of polar compounds of positive dielectric anisotropy, characterised in that it comprises one, two or more compound(s) of the general formula I

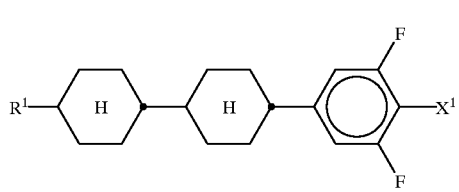

in which
 $R^1$ is an alkyl or alkenyl radical having 1 or 2 to 7 carbon atoms respectively, preferably having 2 to 5 carbon atoms, preferably a straight-chain radical, particularly preferably an alkyl radical, and
 $X^1$ is F, $OCF_3$ or $OCHF_2$, and
one, two or more compound(s) of the general formula II

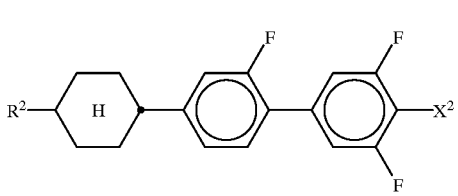

in which
 $R^2$ is an alkyl or alkenyl radical having 1 or 2 to 7 carbon atoms respectively, preferably having 2 to 5 carbon atoms, preferably a straight-chain radical, particularly preferably an alkyl radical, and
 $X^2$ is F, $OCF_3$ or $OCHF_2$, and
one or more compound(s) of the general formula IV

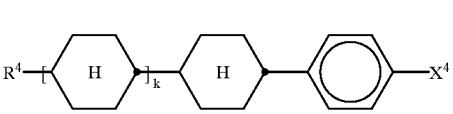

in which
 $R^4$ is an alkyl or alkenyl radical having 1 or 2 to 7 carbon atoms respectively, preferably having 2 to 5 carbon atoms, preferably a straight-chain radical, particularly preferably an alkyl radical,
 $X^4$ is F, Cl, $OCF_3$ or $OCHF_2$, preferably F or $OCF_3$, and
 k is 0 or 1, and
optionally one or more compound(s) of the general formula III

III

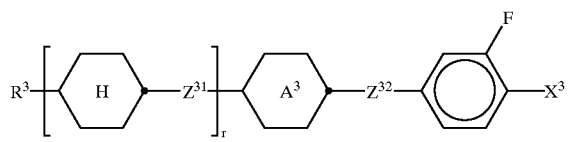

in which
- $R^3$ is an alkyl or alkenyl radical having 1 or 2 to 7 carbon atoms respectively, preferably having 2 to 5 carbon atoms, preferably a straight-chain radical, particularly preferably an alkyl radical,
- $Z^{32}$ and, if present, $Z^{31}$ are each, independently of one another, —CH$_2$—CH$_2$—, —CH=CH— or a single bond, preferably only one of $Z^{31}$ and $Z^{32}$ is —CH$_2$—CH$_2$— or —CH=CH—,

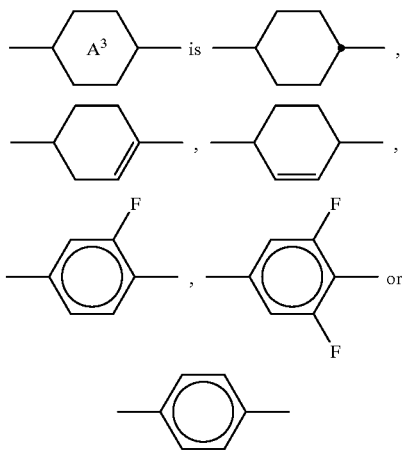

preferably

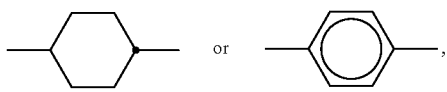

particularly preferably

$X^3$ is F, OCF$_3$ or OCHF$_2$, preferably F, and
r is 0 or 1,
and optionally one or more compound(s) of the general formula V

V

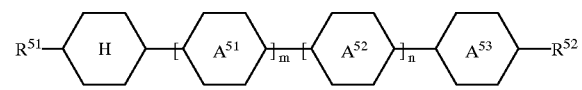

in which

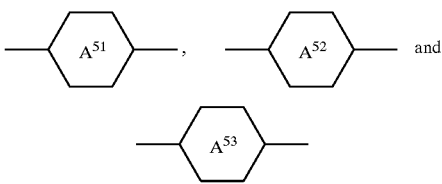

are each, independently of one another,

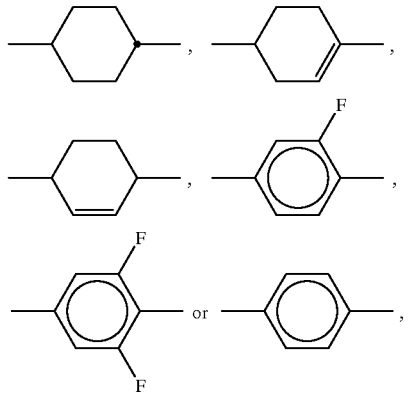

preferably

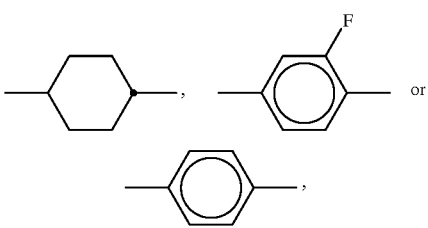

particularly preferably

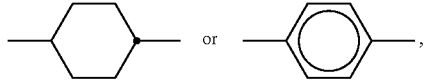

$R^{51}$ and $R^{52}$ are each, independently of one another, an alkyl, alkoxy or alkenyl radical having 1 or 2 to 7 carbon atoms respectively, preferably having 1 to 5 carbon atoms, preferably a straight-chain radical, particularly preferably an alkyl radical, and n and m are each, independently of one another, 0 or 1.

The invention furthermore relates to a multibottle system, preferably a 2- or 4-bottle system, particularly preferably a 4-bottle system, by means of which selected properties of a liquid-crystal medium can be adjusted within a prespecified range by simple mixing. Preferably the birefringence or the threshold voltage, particularly preferably both properties, can be adjusted.

The media according to the invention preferably comprise one or more compounds of the formula I selected from the group consisting of the compounds of the formulae Ia to Ic

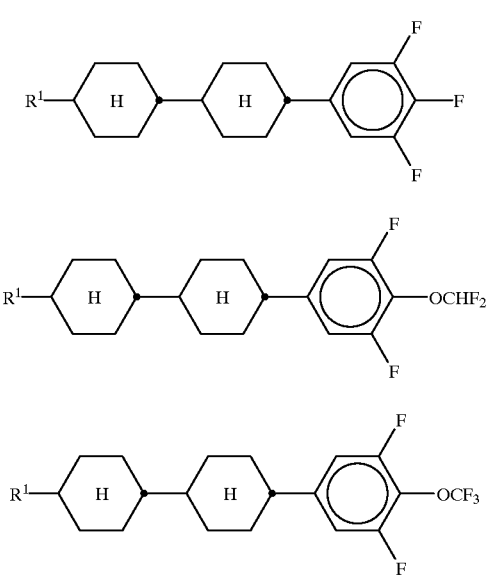

in which

R$^1$ is an alkyl or alkenyl radical having 1 or 2 to 7 carbon atoms respectively, preferably having 2 to 5 carbon atoms, preferably a straight-chain radical, particularly preferably an alkyl radical.

The media according to the invention preferably comprise one or more compounds of the formula II selected from the group consisting of the compounds of the formulae IIa to IIc:

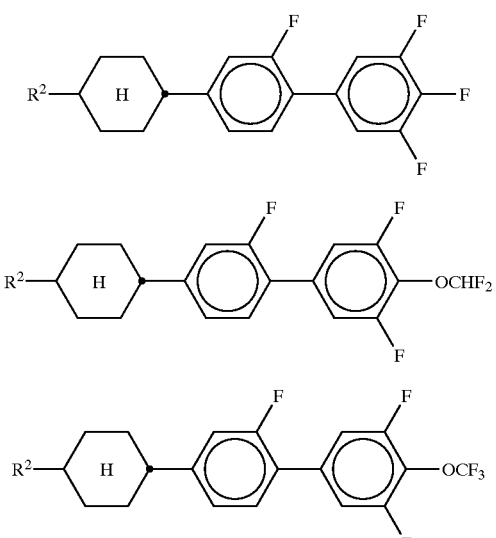

in which

R$^2$ is an alkyl or alkenyl radical having 1 or 2 to 7 carbon atoms respectively, preferably having 2 to 5 carbon atoms, preferably a straight-chain radical, particularly preferably an alkyl radical.

The media according to the invention preferably comprise one or more compounds of the formula III selected from the group consisting of the compounds of the formulae IIIa to IIIi:

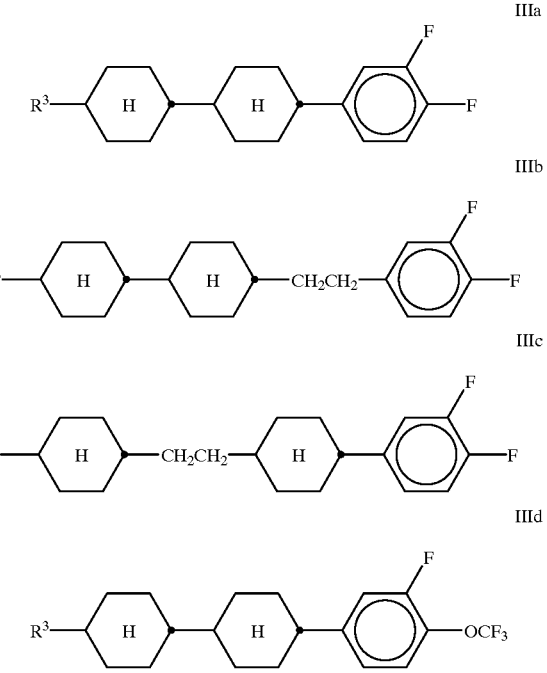

in which

R$^3$ is an alkyl or alkenyl radical having 1 or 2 to 7 carbon atoms respectively, preferably having 2 to 5 carbon atoms, preferably a straight-chain radical, particularly preferably an alkyl radical.

The media according to the invention preferably comprise one or more compounds of the formula IV selected from the group consisting of the compounds of the formulae IVa to IVc:

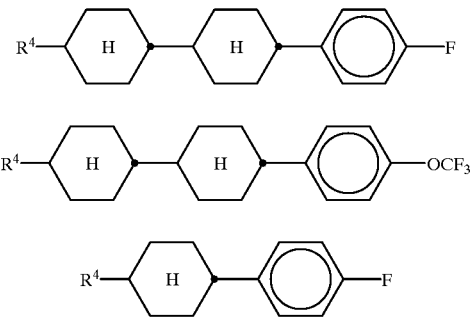

in which

R$^4$ is an alkyl or alkenyl radical having 1 or 2 to 7 carbon atoms respectively, preferably having 2 to 5 carbon atoms, preferably a straight-chain radical, particularly preferably an alkyl radical.

The media according to the invention preferably comprise one or more compounds of the formula V selected from the group consisting of the compounds of the formulae Va to Vh:

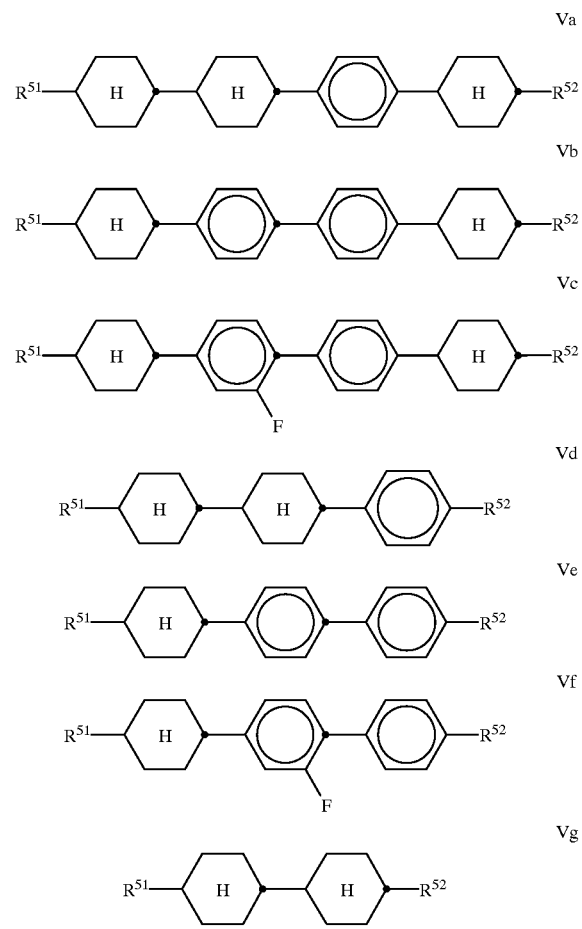

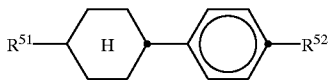

in which

R$^{51}$ and R$^{52}$ are each, independently of one another, an alkyl, alkoxy or alkenyl radical having 1 or 2 to 7 carbon atoms respectively, preferably having 1 to 5 carbon atoms, preferably a straight-chain radical, particularly preferably an alkyl radical.

The compounds of the formulae I to V and their sub-formulae which can be used in the media according to the invention are either known or are prepared analogously to the known compounds by known methods.

The invention also relates to electro-optical displays (in particular MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes.

The liquid-crystal mixtures according to the invention enable a significant widening of the available parameter latitude.

The achievable combinations of clearing point, viscosity at low temperature, thermal and UV stability, optical anisotropy (i.e. birefringence) and threshold voltage are far superior to previous materials from the prior art.

The liquid-crystal mixtures according to the invention, while retaining the nematic phase down to −20° C. and preferably down to −30° C., particularly preferably down to −40° C., enable clearing points above 75° C., preferably above 80° C., particularly preferably above 90° C., simultaneously birefringence values ≦0.090 or ≧0.100, preferably ≦0.085 or ≧0.105, particularly preferably ≦0.080 or ≧0.110, and a low threshold voltage to be achieved, enabling excellent MLC displays to be obtained.

In particular, the mixtures are characterised by low operating voltages. The TN thresholds are below 1.6 V, preferably below 1.5 V, particularly preferably <1.4 V.

The mixtures according to the invention are particularly preferably characterised by a clearing point of 85° C. or above and
  a threshold voltage of 1.50 V or less and a Δn of 0.085 or less or of 0.120 or more and preferably
  a threshold voltage of 1.40 V or less and a Δn of 0.090 or less or of 0.11 0 or more.

It is evident to the person skilled in the art that, through a suitable choice of the components of the mixtures according to the invention, it is also possible for higher clearing points (for example above 100° C.) to be achieved at lower dielectric anisotropy values and thus higher threshold voltages or for lower clearing points to be achieved at higher dielectric anisotropy values (of, for example, 12 or more) and thus lower threshold voltages (for example <1.1 V) with retention of the other advantageous properties. Also at viscosities correspondingly increased only slightly, it is likewise possible to obtain mixtures having greater Δ∈ and thus lower thresholds. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975], where, besides particularly favorable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistances to be achieved using the mixtures according to the invention at the first minimum than in the case of mixtures comprising cyano compounds, in particular comprising benzonitrile compounds. By selecting the individual components and their proportions by weight, the person skilled in the art is able to set the birefringence necessary for a pre-specified layer thickness of the MLC display using simple routine methods. The requirements of reflective MLC displays have been described, for example, in Digest of Technical Papers, SID Symposium, 1998.

The rotational viscosity $\gamma_1$ at 20° C. is preferably <160 mpa.s, particularly preferably <130 mPa.s. The nematic phase range preferably has a width of at least 90 degrees, in particular at least 100 degrees. This range preferably extends from at least −30° C. to +80° C., particularly preferably at least from −30° C. to +85° C. or at least from −40° C. to 85° C.

Measurements of the capacity holding ratio, also known as the voltage holding ratio (also abbreviated to HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I have an adequate HR for MLC displays. C denotes a crystalline phase, S a smectic phase, $S_C$ a smectic C phase, $S_B$ a smectic B phase, N a nematic phase and I the isotropic phase.

The media according to the invention preferably comprise a plurality of (preferably 2 or more) compounds of the formula I, and the proportion of these compounds is 5% –95%, preferably 10% –70% and particularly preferably in the range 15% –65%.

The media according to the invention preferably comprise compounds of the formulae I to V in the concentrations given in the following table (Table 1).

TABLE 1

Preferred concentrations of the compounds

| Formula | Concentration range $c_{min}$–$c_{max}$/% | | |
|---|---|---|---|
| | | preferably | particularly pref. |
| I | 3–65 | 5–60 | 8–65 |
| II | 3–40 | 4–30 | 5–25 |
| III | 2–50 | 3–45 | 4–40 |
| IV | 10–50 | 15–45 | 20–40 |
| V | 0–30 | 0–25 | 0–20 |

In a preferred embodiment, in particular in the case of the achievement of a "corner mixture" of a multibottle system of high birefringence, the medium preferably comprises compounds of the formulae I to V in the concentrations given in Table 2.

TABLE 2

Preferred concentrations for media of high Δn

| Formula | Concentration range $c_{min}$–$c_{max}$/% | | |
|---|---|---|---|
| | | preferably | particularly pref. |
| I | 3–30 | 5–25 | 5–20 |
| II | 3–40 | 4–30 | 5–25 |
| III | 2–50 | 5–45 | 10–45 |
| IV | 10–50 | 15–45 | 20–40 |
| V | 0–30 | 0–25 | 0–25 |

In a further preferred embodiment, in particular in the case of the achievement of a "corner mixture" of a multibottle system of low birefringence, the medium preferably comprises compounds of the formulae I to V in the concentrations given in Table 3.

TABLE 3

Preferred concentrations for media of low Δn

| Formula | Concentration range $c_{min}$–$c_{max}$/% | | |
|---|---|---|---|
| | | preferably | particularly pref. |
| I | 10–65 | 20–60 | 25–55 |
| II | 3–40 | 4–30 | 5–25 |
| III | 0–50 | 2–35 | 3–25 |
| IV | 10–50 | 15–45 | 20–40 |
| V | 0–30 | 0–20 | 0–10 |

Preferred embodiments are indicated below.

a) The medium comprises one or more compound(s) of the formula III.

b) The medium comprises one or more compound(s) selected from the group consisting of the compounds of the formulae Ia to Ic.

c) The medium comprises one or more compound(s) of the formula Ia.

d) The medium comprises one or more compound(s) of the formula Ib.

e) The medium comprises one or more compound(s) of the formula II in which $X^2$ is F.

f) The medium comprises one or more compound(s) selected from the group consisting of the compounds of the formulae IIIa to IIIb, preferably selected from the group consisting of the compounds of the formulae IIIa, IIIb, IIId, IIIg, IIIi, IIIj and IIIk, very particularly preferably selected from the group consisting of the compounds of the formulae IIIa, IIIb, IIId and IIIg.

g) The medium comprises one or more compounds of the formula IVa or of the formula IVc, preferably of the formula IVa and IVc.

h) The medium comprises one or more compound(s) selected from the group consisting of the compounds Va to Vc, preferably of the formula Va or Vc.

i) The medium comprises one or more compound(s) selected from the group consisting of the compounds Vd to Vf, preferably of the formula Vf.

j) The medium comprises one or more compound(s) of the formula Vg and/or of the formula Vh, preferably of the formula Vh.

k) The medium essentially consists of compounds of the formulae I to V, where "essentially" in this application means to an extent of greater than 50%, preferably to an extent of 80% or more and particularly preferably to an extent of 90% or more.

l) The medium essentially consists of compounds of the formulae I to IV.

It has been found that even a relatively small proportion of compounds of the formulae I and II mixed with conventional liquid-crystal materials, but in particular with one or more compounds of the formulae III and/or IV and/or V, results in a significant increase in the voltage holding ratio values, with broad nematic phases with low smectic-nematic transition temperatures being observed at the same time, improving the shelf life.

The term "alkyl" preferably covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" preferably covers straight-chain and branched alkenyl groups having 2–7 carbon atoms, in particular the straight-chain groups. Particularly preferred alkenyl groups are $C_2$–$C_7$-1 E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1 E-alkenyl, $C_4$–$C_7$-3E-alkenyl and $C_5$–$C_7$-4-alkenyl. Examples of further preferred alkenyl groups are vinyl, 1E-propenyl, 1E-butenyl, 1E-pentenyl, 1 E-hexenyl, 1 E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. n is preferably =1 and m is preferably from 1 to 6.

Through a suitable choice of the meanings of $R^0$, $R^{0'}$, $R^{0''}$, $X^0$ and $X^{0'}$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and smaller values of $k_{33}/k_{11}$ compared with alkyl and alkoxy radicals.

A —$CH_2CH_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae I and II and III to V depends substantially on the desired properties, on the choice of the compounds of the formulae I to V, and on the choice of any other components that may be present. Suitable mixing ratios within the range given above can easily be determined from case to case.

The total amount of compounds of the formulae I to V in the mixtures according to the invention is not especially crucial. The mixtures can therefore comprise one or more further components for the purposes of optimising various properties. However, the observed effect on the addressing times and the threshold voltage is generally greater, the higher the total concentration of compounds of the formulae I to V.

Mixtures which, besides compounds of the formulae Ia and Ib and of the formula IIa, comprise compounds of the formula IV, in particular IVa or IVb, very particularly of the formula IVb, are distinguished by low birefringence and low threshold voltages.

The construction of the MLC display according to the invention from polarizers, electrode base plates and surface-treated electrodes corresponds to the conventional construction for displays of this type. The term "conventional construction" is broadly drawn here and also covers all derivatives and modifications of the MLC display, in particular including matrix display elements based on poly-Si TFT or MIM and very particularly reflective displays.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in the lesser amount is dissolved in the components making up the principal constituent, advantageously at elevated temperature. It is also possible to prepare the mixtures in other conventional manners, for example by using premixes, for example mixtures of homologous compounds, or using so-called multibottle systems, which typically consist of four corner mixtures which in each case in pairs differ in only one physical property.

The liquid-crystal media may also comprise further additives known to the person skilled in the art and described in the literature. For example, 0–15%, preferably 0–10%, of pleochroic dyes or chiral dopants can be added. The individual added compounds are employed in concentrations of from 0.01 to 6% and preferably from 0.1 to 3%. However, the concentration data for the other constituents of the liquid-crystal mixtures, i.e. of the liquid-crystalline or mesogenic compounds, are indicated here without taking into account the concentration of these additives.

Above and below, unless explicitly stated otherwise:

percentages denote per cent by weight, temperature data are indicated in ° C., temperature differences are indicated in differential degrees Celsius (degrees for short), all physical properties are indicated for 20° C., the term "essential consist of" means consist to the extent of 50% or more, preferably to the extent of 80% or more and particularly preferably to the extent of 90% or more, the term "compounds" without further restrictions, for clarification usually written as compound(s), means a compound or preferably a plurality of compounds, and

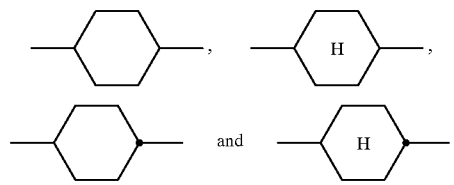

denotes trans-1,4-cyclohexenylene.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively, where n and m, independently of one another, are preferably an integer from 1 to 7. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| Nm | $C_nH_{2n+1}$ | $C_mH_{2m+1}$ | H | H |
| Nom | $C_nH_{2n+1}$ | $OC_mH_{2m+1}$ | H | H |
| nO.m | $OC_nH_{2n+1}$ | $C_mH_{2m+1}$ | H | H |
| Nm | $C_nH_{2n+1}$ | $C_mH_{2m+1}$ | H | H |
| Nom | $C_nH_{2n+1}$ | $OC_mH_{2m+1}$ | H | H |
| nO.m | $OC_nH_{2n+1}$ | $C_mH_{2m+1}$ | H | H |
| N | $C_nH_{2n+1}$ | CN | H | H |
| nN.F | $C_nH_{2n+1}$ | CN | F | H |
| nN.F.F | $C_nH_{2n+1}$ | CN | F | F |
| NOF | $OC_nH_{2n+1}$ | F | H | H |
| NCl | $C_nH_{2n+1}$ | Cl | H | H |
| NCl.F | $C_nH_{2n+1}$ | Cl | F | H |
| NCl.F.F | $C_nH_{2n+1}$ | Cl | F | F |

-continued

| Code for $R^1$, $R^2$, $L^1$, $L^2$ | $R^1$ | $R^2$ | $L^1$ | $L^2$ |
|---|---|---|---|---|
| NF | $C_nH_{2n+1}$ | F | H | H |
| nF.F | $C_nH_{2n+1}$ | F | F | H |
| nF.F.F | $C_nH_{2n+1}$ | F | F | F |
| $NCF_3$ | $C_nH_{2n+1}$ | $CF_3$ | H | H |
| $nOCF_3$ | $C_nH_{2n+1}$ | $OCF_3$ | H | H |
| $nOCF_3.F$ | $C_nH_{2n+1}$ | $OCF_3$ | F | H |
| $nOCF_3.F.F$ | $C_nH_{2n+1}$ | $OCF_3$ | F | F |
| $nOCF_2$ | $C_nH_{2n+1}$ | $OCHF_2$ | H | H |
| $nOCF_2.F$ | $C_nH_{2n+1}$ | $OCHF_2$ | F | H |
| $nOCF_2.F.F$ | $C_nH_{2n+1}$ | $OCHF_2$ | F | F |
| NS | $C_nH_{2n+1}$ | NCS | H | H |
| RVsN | $C_rH_{2r+1}-CH=CH-C_sH_{2s}-$ | CN | H | H |
| REsN | $C_rH_{2r+1}-O-C_sH_{2s}-$ | CN | H | H |
| NAm | $C_nH_{2n+1}$ | $COOC_mH_{2m+1}$ | H | H |
| $NOCCF_2.F.F$ | $C_nH_{2n+1}$ | $OCH_2CF_2H$ | F | F |

Preferred mixture components are shown in Tables A and B.

The mixtures according to the invention preferably comprise at least one of the compounds of the formulae indicated in Table B.

TABLE A

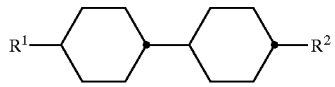

CCH

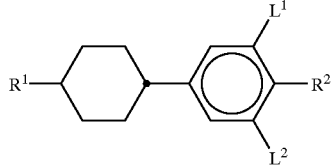

PCH

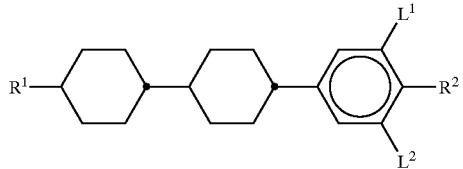

CCP

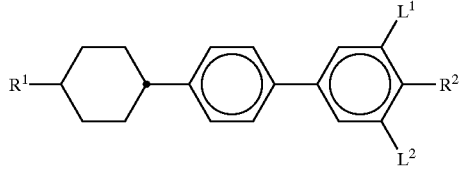

BCH

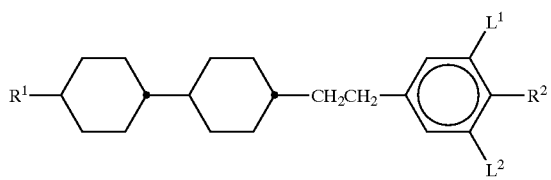

ECCP

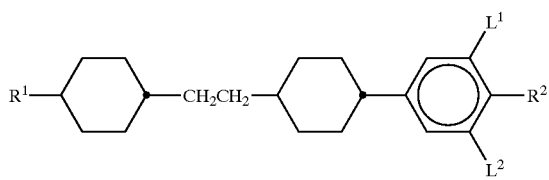

CECP

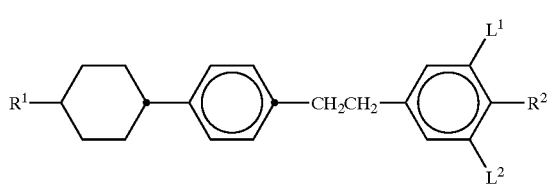

EBCH

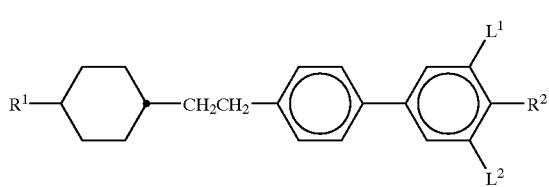

CEB

TABLE B
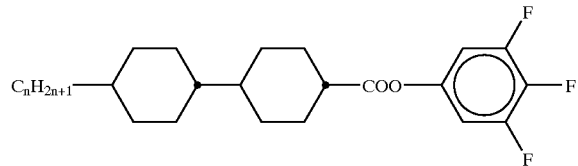
CCZU-n-F
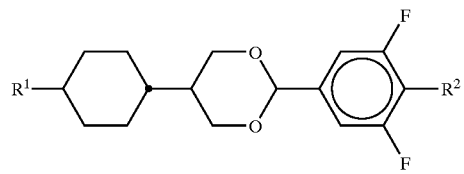
CDU-n-F
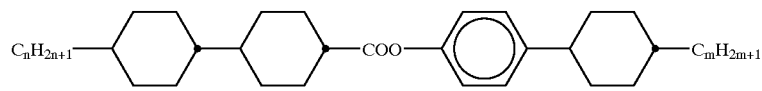
CCPC-nm
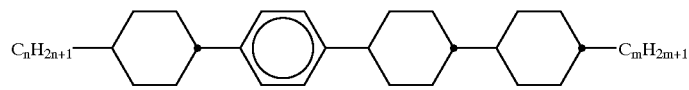
CPCC-nm
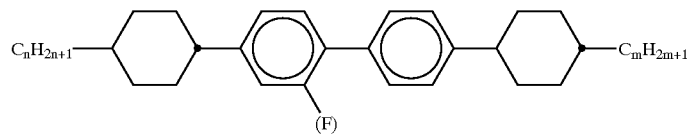
CBC-nm(F)
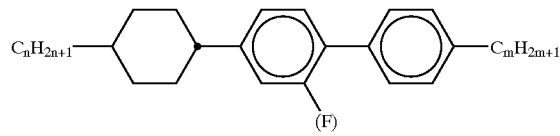
BCH-nm(F)
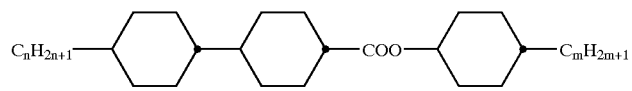
CH-nm
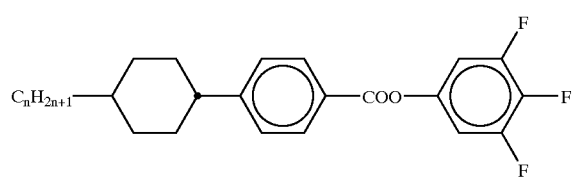
CPZU-n-F

TABLE B-continued

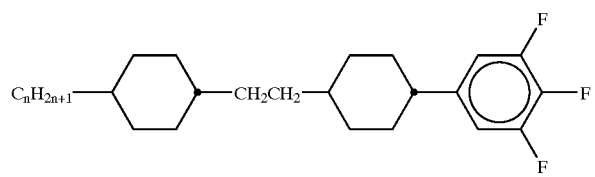

CECU-n-F

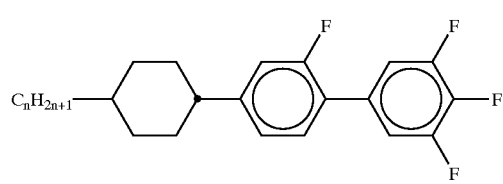

CGU-n-F

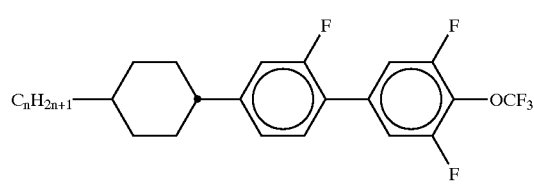

CGU-n-OT

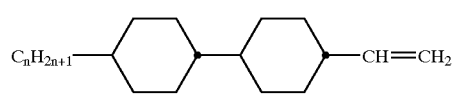

CC-n-V

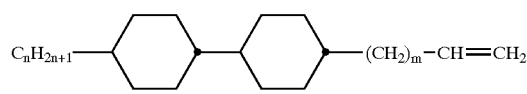

CC-n-mV

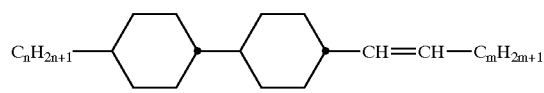

CC-n-Vm

The entire of all applications, patents and publications, cited above, and of corresponding German application No. 10039379.9, filed Aug. 11, 2000, is hereby incorporated by reference.

EXAMPLES

The following examples are intended to illustrate the invention without limiting it. In these examples, All temperatures are given in degrees Celsius. m.p. denotes melting point, cl.p. clearing point. Δn denotes the optical anisotropy (589 nm, 20° C.), Δε denotes the dielectric anisotropy (1 kHz, 20° C.), and the rotational viscosity $\gamma_1$ (mPa.s) was determined at 20° C.

The physical properties of the liquid-crystal mixtures were determined as described in "Physical Properties of Liquid Crystals" Ed. M. Becker, Merck KGaA, status Nov. 1997, unless explicitly stated otherwise.

$V_{10}$ denotes the voltage for 10% relative contrast (viewing angle perpendicular to the plate surface). $t_{on}$ denotes the switch-on time and $t_{off}$ the switch-off time at a given operating voltage. Δn denotes the optical anisotropy and $n_o$ the ordinary refractive index, in each case at 539 nm, unless stated otherwise. Δε denotes the dielectric anisotropy (Δε=$\Delta_{\parallel}$−$\epsilon_{\perp}$, where $\epsilon_{81}$ denotes the dielectric constant parallel to the longitudinal molecular axes and $\epsilon_{\perp}$ denotes the dielectric constant perpendicular thereto). Δn is determined at 589 nm and 20° C. and Δε at 1 kHz and 20° C., unless expressly stated otherwise. The electro-optical data were measured in a TN cell (twist 90°, pre-tilt angle 1°) at the 1st minimum (i.e. at a d·Δn value of 0.5) at 20° C., unless expressly stated otherwise.

The stability of the nematic phase at low temperatures was checked at fixed temperatures both in the flow viscometer and in sealed bottles in the refrigerator. In addition, filled TN cells sealed with adhesive were stored in the refrigerator. The TN cells used corresponded to the cells used for the electro-optical investigations. For each storage test at a given temperature, at least five samples were used.

The stable storage time indicated was the time at which no change was finally observed in any of the samples. The rotational viscosity value for ZLI-4792 was 133 mPa·s at 20° C. using the calibrated self-built rotational viscometer.

The following examples are intended to explain the invention without limiting it. However, they give an overview of possible compositions of the media and of the achievable physical properties, in particular their combinations.

Example 1

A 4-bottle system consisting of the four liquid-crystal mixtures A, B, C and D and having the following compositions and properties was prepared.

| | Concentration/ % by weight | Physical properties | |
|---|---|---|---|
| Mixture A Compound abbreviation | | | |
| PCH-7F | 3.0 | Clearing point (T(N,I)) | = 90° C. |
| CCP-2F.F.F | 12.0 | Smectic-nematic | |
| CCP-3F.F.F | 13.0 | transition (T(S,N)) | < −40° C. |
| CCP-5F.F.F | 8.0 | $n_o$ (20° C., 589 nm) | = 1.4740 |
| CCP-3OCF2.F.F | 13.0 | $\Delta n$ (20° C., 589 nm) | = 0.0876 |
| CCP-5OCF2.F.F | 4.0 | $\Delta \epsilon$ (20° C., 1 kHz) | = 9.4 |
| CCP-2OCF3 | 7.0 | $\epsilon_\perp$ (20° C., 1 kHz) | = 3.7 |
| CCP-3OCF3 | 8.0 | $\gamma_1$ (20° C.) | = 156 |
| CCP-4OCF3 | 5.0 | | mPa · s |
| CCP-5OCF3 | 8.0 | d · $\Delta n$ | = 0.50 µm |
| CGU-2-F | 5.0 | $V_{10}$ (20° C., 1 kHz) | = 1.42 V |
| CGU-3-F | 10.0 | $V_{90}$ (20° C., 1 kHz) | = 2.22 V |
| ECCP-3F.F | 5.0 | | |
| Σ | 100.0 | | |
| Mixture B Compound abbreviation | | | |
| PCH-7F | 6.0 | Clearing point (T(N,I)) | = 91° C. |
| CCP-2OCF2.F.F | 14.0 | Smectic-nematic | |
| CCP-2OCF3 | 8.0 | transition (T(S,N)) | < −40° C. |
| CCP-3OCF3 | 7.0 | $n_o$ (20° C., 589 nm) | = 1.4843 |
| CCP-4OCF3 | 6.0 | $\Delta n$ (20° C., 589 nm) | = 0.1103 |
| CCP-5OCF3 | 8.0 | $\Delta \epsilon$ (20° C., 1 kHz) | = 8.2 |
| CGU-3-F | 12.0 | $\epsilon_\perp$ (20° C., 1 kHz) | = 3.9 |
| CGU-5-F | 8.0 | $\gamma_1$ (20° C.) | = 162 |
| BCH-2F.F | 9.0 | | mPa · s |
| BCH-3F.F | 8.0 | d · $\Delta n$ | = 0.50 µm |
| BCH-5F.F | 8.0 | $V_{10}$ (20° C., 1 kHz) | = 1.46 V |
| CBC-33F | 3.0 | $V_{90}$ (20° C., 1 kHz) | = 2.27 V |
| CBC-53F | 3.0 | | |
| Σ | 100.0 | | |
| Mixture C Compound abbreviation | | | |
| PCH-7F | 6.0 | Clearing point (T(N,I)) | = 92° C. |
| CCH-35 | 6.0 | Smectic-nematic | |
| CCP-2OCF3 | 8.0 | transition (T(S,N)) | < −40° C. |
| CCP-3OCF3 | 8.0 | $n_o$ (20° C., 589 nm) | = 1.4760 |
| CCP-4OCF3 | 7.0 | $\Delta n$ (20° C., 589 nm) | = 0.0860 |
| CCP-5OCF3 | 8.0 | $\Delta \epsilon$ (20° C., 1 kHz) | = 7.3 |
| CCP-2F.F.F | 12.0 | $\epsilon_\perp$ (20° C., 1 kHz) | = 3.4 |
| CCP-3F.F.F | 11.0 | $\gamma_1$ (20° C.) | = 125 |
| CCP-5F.F.F | 8.0 | | mPa · s |
| CGU-3-F | 5.0 | d · $\Delta n$ | = 0.50 µm |
| ECCP-3F.F | 7.0 | $V_{10}$ (20° C., 1 kHz) | = 1.68 V |
| ECCP-5F.F | 5.0 | $V_{90}$ (20° C., 1 kHz) | = 2.65 V |
| BCH-3F.F | 9.0 | | |
| Σ | 100.0 | | |
| Mixture D Compound abbreviation | | | |
| PCH-7F | 9.0 | Clearing point (T(N,I)) | = 92° C. |
| CCP-2OCF3 | 8.0 | Smectic-nematic | |
| CCP-3OCF3 | 7.0 | transition (T(S,N)) | < −30° C. |
| CCP-5OCF3 | 6.0 | $n_o$ (20° C., 589 nm) | = 1.4901 |
| CCP-2F.F.F | 10.0 | $\Delta n$ (20° C., 589 nm) | = 0.1114 |
| ECCP-3F.F | 10.0 | $\Delta \epsilon$ (20° C., 1 kHz) | = 6.1 |
| CGU-3-F | 6.0 | $\epsilon_\perp$ (20° C., 1 kHz) | = 3.6 |
| BCH-2F.F | 9.0 | $\gamma_1$ (20° C.) | = 136 |
| BCH-3F.F | 9.0 | | mPa · s |
| BCH-5F.F | 9.0 | d · $\Delta n$ | = 0.50 µm |
| BCH-32F | 7.0 | $V_{10}$ (20° C., 1 kHz) | = 1.73 V |
| BCH-52F | 7.0 | $V_{90}$ (20° C., 1 kHz) | = 2.64 V |
| CBC-33F | 3.0 | | |
| Σ | 100.0 | | |

The TN cells achieved in this way are distinguished, in particular, by their low addressing voltage (threshold voltage and saturation voltage) in combination with excellent stability on storage at low temperatures.

The pairs of mixtures A-B and C-D each represent a 2-bottle system with variable birefringence in the range from about 0.087 to 0.111, and mixture pairs A-C and B-D each represent a 2-bottle system with variable threshold voltage in the range from about 1.4 V to 1.7 V. The four mixtures A to D can thus be used as the corner mixtures of a 4-bottle system which covers these ranges.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium of positive dielectric anisotropy, which comprises:

one or more compounds of the formula I:

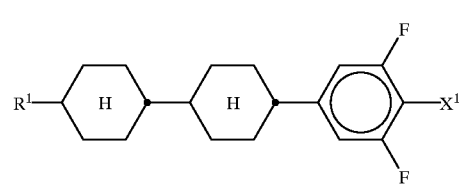

in which

R$^1$ is an alkyl or alkenyl radical having 1 or 2 to 7 carbon atoms, and

X$^1$ is F, OCF$_3$ or OCHF$_2$;

one or more compounds of the formula II

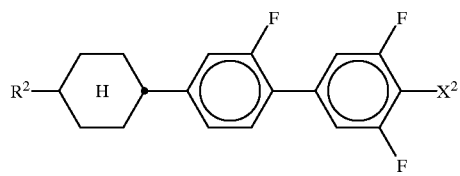

in which

R$^2$ is an alkyl or alkenyl radical having 1 or 2 to 7 carbon atoms, and

X$^2$ is F, OCF$_3$ or OCHF$_2$;

one or more compound(s) of the formulae IIIb or IIIg

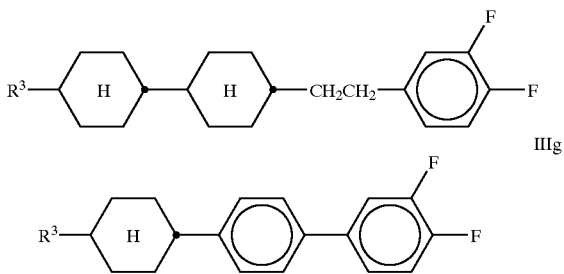

which R$^3$ is an alkyl of 1 to 7 carbon atoms or alkenyl radical of 2 to 7 carbon atoms;

one or more compound(s) of that formula IV

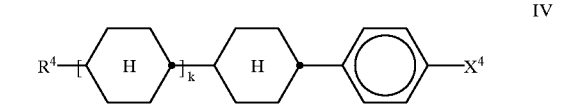

in which

R$^4$ is an alkyl or alkenyl radical having 1 to 7 carbon atoms or alkenyl radical having 2 to 7 carbon atoms, X$^4$ is F, Cl, and k is 0 or 1; and one or more compounds of the formula V

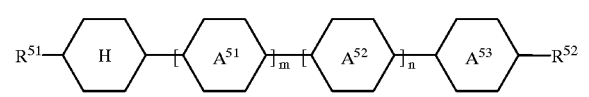

in which

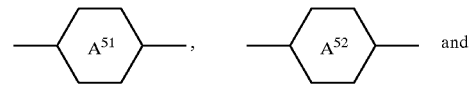

are each, independently of one another,

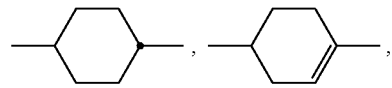

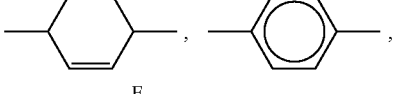

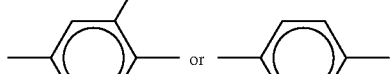

R$^{51}$ and R$^{52}$ are each, independently of one another, an alkyl or alkoxy radical having 1 to 7 carbon atoms or alkenyl radical having 2 to 7 carbon atoms, and n and m are each, independently of one another, 0 or 1;

wherein the medium exhibits a nematic phase at least down to −20° C. and at least above 75° C., birefringe value of ≦0.090 or ≧0.100, and a rotational viscosity, γ$_1$, at 20° C., of less than 160 mPa·s.

2. The medium according to claim 1, which further comprises one or more compounds of the formula III, which are not of formula IIIb or IIIg in claim 1:

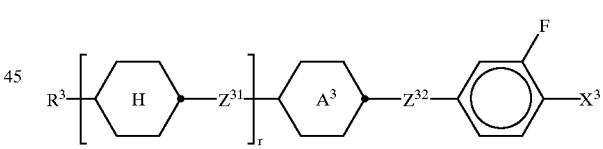

in which

R$^3$ is an alkyl radical having 1 to 7 carbon atoms or alkenyl radical having 2 to 7 carbon atoms, Z$^{32}$ and, if present, Z$^{31}$ are each, independently of one another, —CH$_2$—CH$_2$—, —CH=CH— or a single bond,

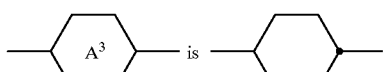

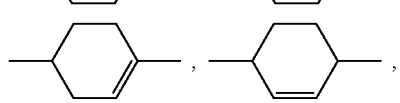

-continued

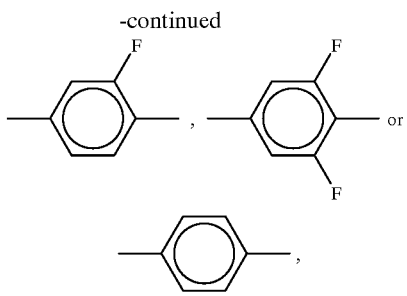

$X^3$ is F, $OCF_3$ or $OCHF_2$, and r is 0 or 1.

3. A medium according to claim 1, wherein the proportion of compounds of the formula I in the medium as a whole is at least 5% by weight.

4. A medium according to claim 2, wherein the proportion of compounds of the formulae II, IIIb, IIIg, III, IV and V together in the medium as a whole is from 40% to 90% by weight.

5. A multibottle liquid-crystal system which comprises a medium according to claim 1.

6. An electro-optical device which comprises a liquid-crystalline medium of claim 1.

7. A medium according to claim 2, which consists essentially of compounds of the formulae I, II, IIIb, IIIg, III, IV and V.

8. A medium according to claim 1, which exhibits a nematic phase at least down to −30° C. and at least above 80° C., a birefringence value of ≦0.085 or ≧0.105, and a rotational viscosity, $\gamma_1$, at 20° C., of less than 130 mPa·s.

9. A medium according to claim 2 which comprises a concentration of 3–65% compounds of the formula I, 3–40% of compounds of the formula II, 2–50% of compounds of the formulae IIIb, IIIg and III, 10–50% of compounds of the formula IV and 30% or less of compounds of the formula V.

10. A medium according to claim 2, which comprises more than 50% of compounds of the formulae I, II, IIIb, IIIg, III, IV and V.

11. A medium according to claim 2, which comprises more than 50% of compounds of the formulae I, II, IIIb, IIIg, III, IV and V.

12. A medium according to claim 1, wherein, in formula IV, $X^4$ is F.

13. A medium according to claim 1, which comprises a compound of the formula IV wherein k=0.

14. A medium according to claim 1, which exhibits a rotational viscosity, $\gamma_1$ at 20° C., of less than 130 mPa·s.

15. A medium according to claim 1, which exhibits a birefringence value of ≦0.080 or ≧0.110.

16. A medium according to claim 14, which exhibits a birefringence value of ≦0.080 or ≧0.110.

17. A medium according to claim 1, wherein the medium comprises at least one compound of the formula IIIg.

18. A medium according to claim 1, wherein the medium comprises at least one compound of the formula I wherein $X^1$ is F.

* * * * *

UNITED STATES PATENT AND TRADEMARK OFFICE
CERTIFICATE OF CORRECTION

PATENT NO. : 6,821,580 B2
DATED : November 23, 2004
INVENTOR(S) : Sabine Schoen

It is certified that error appears in the above-identified patent and that said Letters Patent is hereby corrected as shown below:

Column 23,
Lines 18 and 19, should read as follows:
-- $R^2$ is an alkyl radical having 1 to 7 carbon atoms or alkenyl radical having 2 to 7 carbon atoms, and --.

Column 24,
Line 34, delete "birefring" and insert -- birefringence --.

Signed and Sealed this

Nineteenth Day of April, 2005

JON W. DUDAS
*Director of the United States Patent and Trademark Office*